Jan. 12, 1954   R. W. WALKER   2,665,563
REFRIGERATED CREAM DISPENSING CABINET
Filed April 19, 1948   2 Sheets-Sheet 1
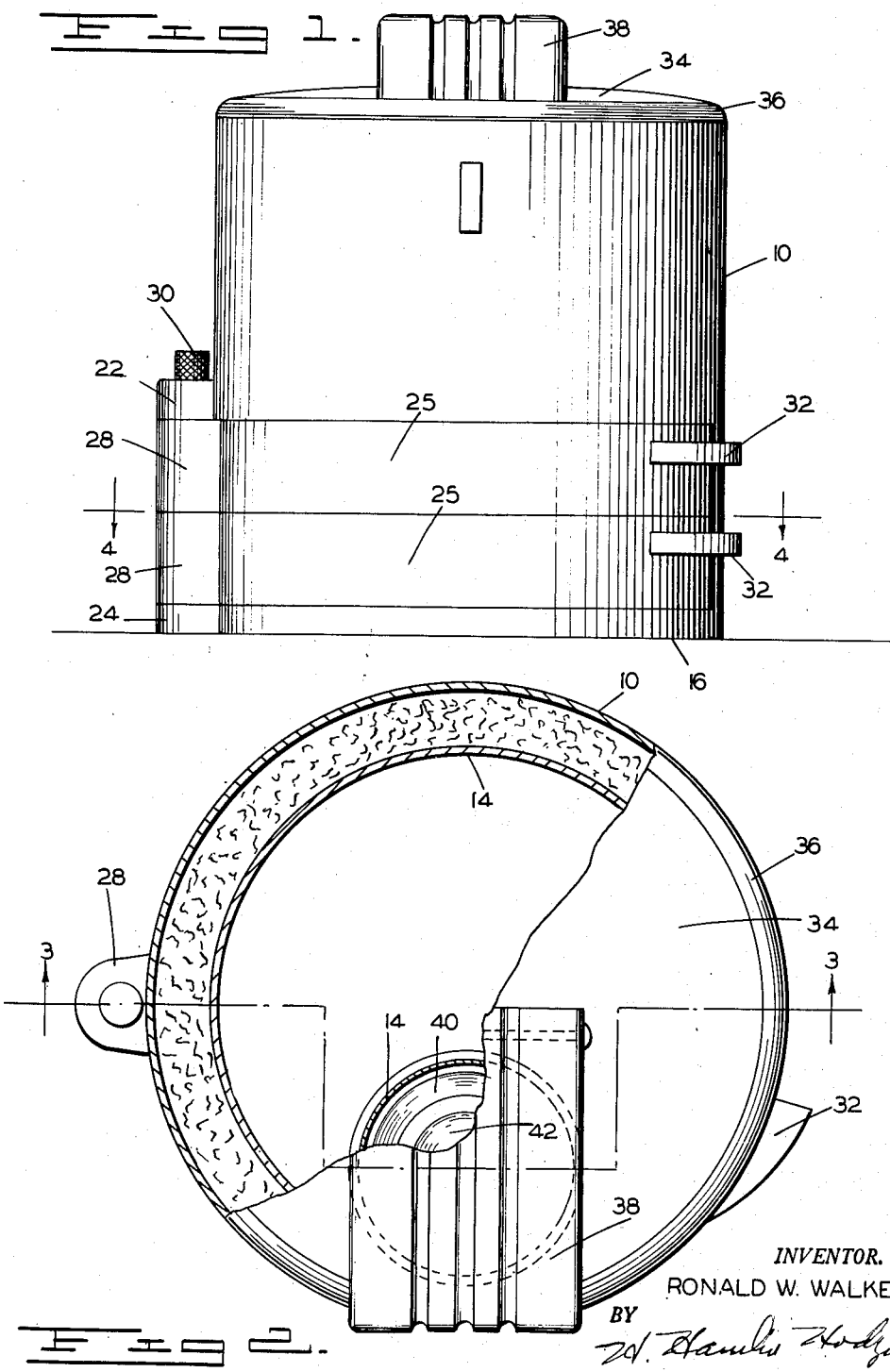
INVENTOR.
RONALD W. WALKER
BY
ATTORNEY Jan. 12, 1954
R. W. WALKER
2,665,563
REFRIGERATED CREAM DISPENSING CABINET
Filed April 19, 1948
2 Sheets-Sheet 2
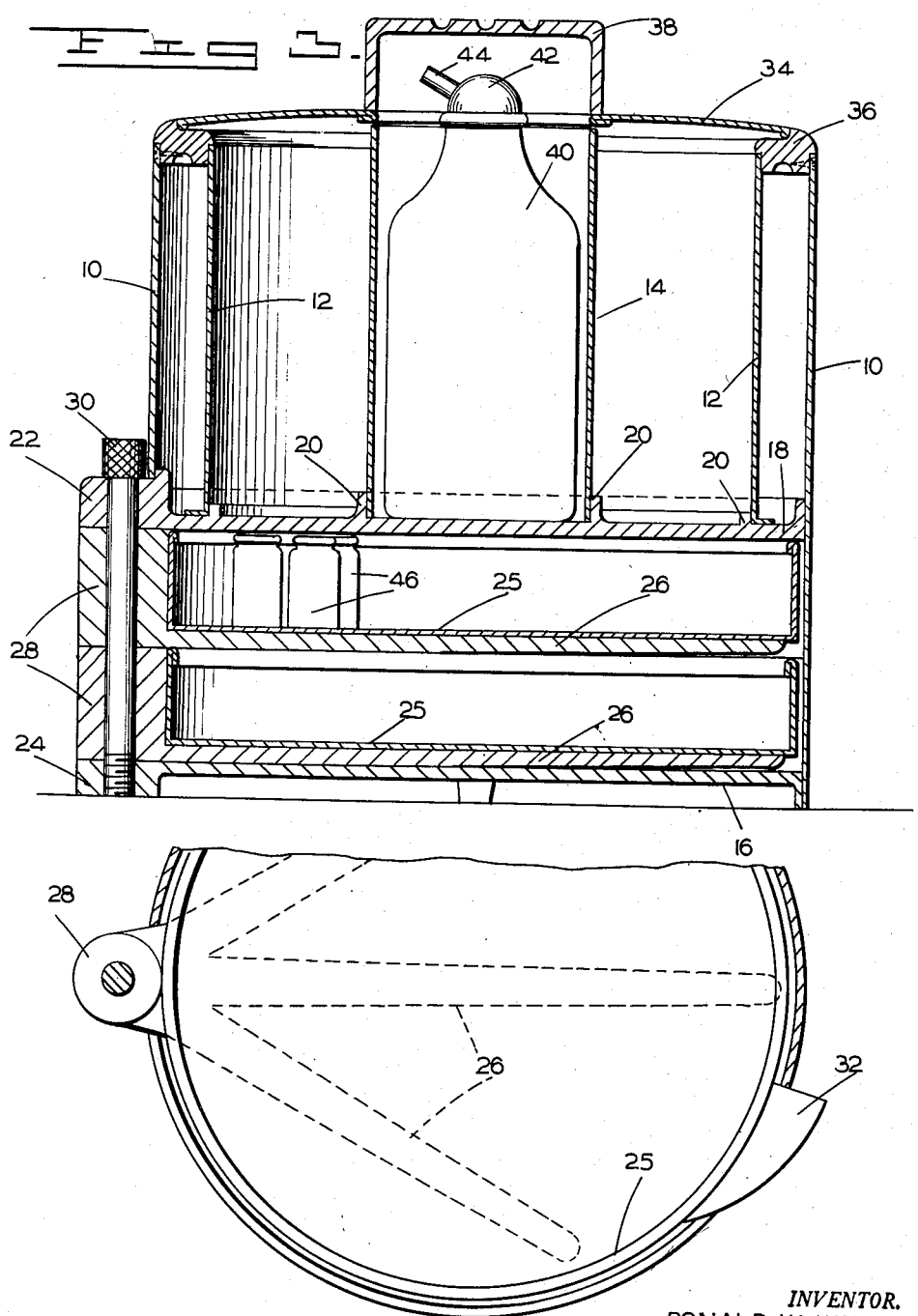
INVENTOR.
RONALD W. WALKER
BY
ATTORNEY

UNITED STATES PATENT OFFICE 2,665,563

REFRIGERATED CREAM DISPENSING CABINET

Ronald W. Walker, Amarillo, Tex.

Application April 19, 1948, Serial No. 21,956

2 Claims. (Cl. 62—77)

For many years it has been the practice in restaurants, cafes, cafeterias, hotel dining and breakfast rooms, drug stores, and the like places handling and dispensing foods and drinks, to have convenient a plurality of small containers, commonly called "creamers." These are adapted to contain a measured amount of cream which is considered the proper amount of cream to be added to a cup of coffee. Generally speaking, these "creamers" are preferably filled with cream so that the waiter or waitress can conveniently serve a filled "creamer" with each cup of coffee ordered. While these "creamers" are not necessarily subjected to any unusual amount of contamination, yet the general practice is merely to position a plurality of such "creamers" on a convenient tray or the like, so that a waiter may quickly pick up the necessary number of "creamers" to be served with an ordered number of cups of coffee or the like.

An object of my invention is to provide a refrigerated unit whereby a container of cream may be kept at a desired temperature, and also a plurality of previously filled "creamers" may be conveniently positioned.

A further object of my invention is to provide a sanitary, refrigerated unit adapted to contain a plurality of filled "creamers" and one or more containers for a source of supply of cream.

A still further object of my invention is to provide a refrigerated unit within which a cream container may be stored, and also a plurality of desirable "creamers".

In the drawings:

Fig. 1 is a view in side elevation,

Fig. 2 is a plan view partly broken away,

Fig. 3 is an irregular cross section on the line 3—3 of Fig. 2, and

Fig. 4 is a fragmentary horizontal cross section on the line 4—4 of Fig. 1.

The refrigerating unit is preferably made of cast aluminum, stamped aluminum, stainless steel or any other appropriate metal or material, preferably made in a generally cylindrical shape and having side walls 10. Spaced from the side walls 10, I provide an inner side wall 12, which provides a void space between itself and the side wall 10, into which any suitable insulation (not shown), such as ground cork, or other suitable material may be packed so that outside heat may not enter and pass through the side walls 10 and 12, and likewise cold within the side wall 12 cannot pass therethrough and penetrate the enternal wall 10.

In the approximate center an additional upright wall 14 is provided so that there will be a substantial space between the internal upright wall 12 and the wall 14. This space between the walls 12 and 14 is adapted to be suitably packed with cracked ice, Dry Ice, or other desired refrigerant.

The side wall 10 extends downwardly to a suitable base 16, and has positioned between its top and bottom, where it is attached to the base 16, a sub-base or partition 18. The sub-base or partition 18 is provided with a plurality of suitable cast bosses 20, which are adapted to serve as spacing elements for the walls 12 and 14, described above. It will be understood, of course, that the walls 10, 12 and 14 may be suitably secured to the bosses 20 by any desired method of fastening the same in their desired position, such as riveting, sweating, welding, bolting, or the like.

The partition 18 is provided at one point on its periphery with a suitable outstanding lug 22 which will be in registry with a similar outstanding lug 24, cast on the base 16 in proper alignment with the lug 22 on the partition 18. Suitably positioned between the lugs 22 and 24, I provide a plurality of cast shelves or trays 25, constructed with crowfoot fingers 26, fanning outwardly from lugs 28, similar in size and shape to the lugs 22 and 24 described above. These lugs are positioned as disclosed more particularly in Figs. 1 and 3, and a suitable pivot pin or pintle 30, may be inserted therethrough and fastened by conventional screw threads within the internal screw threads provided in the lug 24, cast integrally with the base 16. With this construction it will be obvious that the upper portion of the container will be securely held in position above the base 16, and the trays 25 supported by the crowfoot fingers 26, will be held so that they may be pivoted into the position in which they are shown in the figures, or may be swung outwardly from the general contour of the container as a whole. Each separate tray 25 is provided with a suitable handle 32, preferably attached thereto approximately diametrically opposed to the lug 28.

Above the partition 18 and adapted to fit over the upper ends of the walls 10, 12 and 14, I provide a suitable cover 34, which is provided around its periphery with a rim 36 adapted to close securely the insulation space between the side wall 10 and the internal side wall 12.

An upstanding, preferably hinged, cover 38 is adapted to cover the internal bottle container surrounded by the side walls 14. It will be understood, of course, that the space between the side walls 14 is large enough to contain a standard milk or cream bottle, such as those commonly used today by dairies. Consequently, when a supply of cream is desired, it will be necessary only to hinge the cover 38 upwardly away from the main cover or top 34, so that the cream bottle 40 may be readily removed therefrom. Preferably the cream bottle 40 will be provided with a suitable cover or top 42, which preferably will be made of metal, rubber, plastic, or other material, and which will be provided with a small spout or spigot 44. The purpose of this is obvious in that the supply bottle of cream may be readily removed and will have been previously provided with a cap having a spout 44, so that cream therefrom may be easily poured into the small "creamers" 46, which will be retained on the trays 25.

It will be noted in Fig. 2 only one supply bottle 40 has been disclosed, but it also will be noted that one half of the general container has been utilized and therefore ample space will be furnished for an additional supply bottle to be stored.

With this construction it will be obvious that a supply bottle of cream, or the like, will be readily maintained at a proper temperature by the ice which is packed between the upright walls 12 and 14, and also the refrigerating effect of the ice will be transmitted through the partition 13 to properly refrigerate the small "creamers," which have been previously filled and positioned on the trays supported by the crowfeet 26. With this construction it will be obvious that a source of supply of cream is properly refrigerated, and also a plurality of "creamers" are not only positioned for proper refrigeration, but for easy access when the same are needed for service.

I claim:

1. In a cream dispensing cabinet an insulated jacket, a refrigerant containing chamber, a container chamber partially surrounded by the said refrigerant containing chamber, a plurality of hingedly supported circular trays below the said refrigerant and container chambers, and a cover mounted above said chambers, a second cover hinged to the first mentioned cover and positioned above and adapted to close the said container chamber.

2. A substantially cylindrical cream dispensing cabinet including a base, a partition, and an insulating jacket circumferentially surrounding the same; a container chamber, and a refrigerant chamber mounted above said partition, and a cover enclosing the said chambers; a horizontally hinged cover secured to said first mentioned cover approximately above said container chamber; and circular trays hingedly secured within the said cylindrical cabinet, beneath the said refrigerant chamber and between the said base and the partition, the said trays swinging outwardly from beneath the said partition.

RONALD W. WALKER.

References Cited in the file of this patent

UNITED STATES PATENTS

| Number | Name | Date |
| --- | --- | --- |
| 940,416 | Young | Nov. 16, 1909 |
| 1,400,643 | Van Dyke | Dec. 20, 1921 |
| 2,104,684 | Wilson | Jan. 4, 1938 |
| 2,112,015 | Crisman | Mar. 22, 1938 |
| 2,119,332 | Kern | May 31, 1938 |
| 2,246,853 | Martin | June 24, 1941 |
| 2,564,165 | Magis | Aug. 14, 1951 |

FOREIGN PATENTS

| Number | Country | Date |
| --- | --- | --- |
| 550,980 | France | Mar. 24, 1923 |